United States Patent [19]
Davet et al.

[11] Patent Number: 5,873,326
[45] Date of Patent: Feb. 23, 1999

[54] ELECTRONIC FISH FEEDER

[76] Inventors: Gerard R. Davet; Jean-Paul Davet, both of 10 Samuel La., Mansfield, Tex. 76063

[21] Appl. No.: 695,217

[22] Filed: Aug. 1, 1996

Related U.S. Application Data

[60] Provisional application No. 60/005,150 Oct. 11, 1995.
[51] Int. Cl.[6] ................................................. A01K 5/02
[52] U.S. Cl. ...................... 119/245; 119/53; 119/51.04; 119/51.11; 119/476
[58] Field of Search ............................. 119/51.04, 51.11, 119/53, 56.1, 57.1, 57.92, 230, 52.1, 476; 222/650, 410

[56] References Cited

U.S. PATENT DOCUMENTS

| | | | |
|---|---|---|---|
| 735,167 | 8/1903 | Steinberg | 119/56.1 |
| 2,568,332 | 9/1951 | Genovese | 119/57.1 |
| 3,717,125 | 2/1973 | Sanders . | |
| 3,939,802 | 2/1976 | Neff | 119/51.04 |
| 4,059,072 | 11/1977 | Vassallo et al. . | |
| 4,688,520 | 8/1987 | Parks | 119/51.11 |
| 5,119,764 | 6/1992 | Tum . | |
| 5,138,979 | 8/1992 | Baird et al. . | |
| 5,154,547 | 10/1992 | Young | 119/51.04 |
| 5,230,300 | 7/1993 | Mezhinsky | 119/51.11 |
| 5,282,438 | 2/1994 | McLaughlin . | |

FOREIGN PATENT DOCUMENTS

| | | | |
|---|---|---|---|
| 2480077 | 10/1981 | France | 119/57.1 |
| 719984 | 4/1942 | Germany | 119/56.1 |
| 2354802 | 5/1975 | Germany | 119/56.1 |
| 648184 | 2/1979 | U.S.S.R. | 119/51.04 |
| 1386130 | 4/1988 | U.S.S.R. | 119/51.04 |
| 1457834 | 2/1989 | U.S.S.R. | 222/410 |
| 2207331 | 2/1989 | United Kingdom | 119/51.04 |

*Primary Examiner*—Todd E. Manahan
*Assistant Examiner*—E. Robert
*Attorney, Agent, or Firm*—Richard C. Litman

[57] ABSTRACT

An electronic food distribution system for pets, particularly fish for feeding and maintaining fish in an aquarium. The system contains an electrical timing circuit for periodically distributing food stuffs contained in a hopper to the aquarium. The distribution is accomplished by an electric motor driving a gear box, the output of the gear box driving a cylinder that has a rough surface. The cylinder in cooperation with a pair of baffles sends a predetermined amount of food into the aquarium during the feeding time interval. This system maintains the feeding of fish during times when manual feeding is unavailable, i.e., absence, vacation, etc. The aesthetic nature of the food distribution system enhances the decor in the environment in which it is used, as well as performing the function for which it is intended.

6 Claims, 11 Drawing Sheets

ELECTRONIC FISH FEEDER

CROSS REFERENCE TO RELATED APPLICATIONS

This application is based on provisional application Ser. No. 60/005,150 filed on Oct. 11, 1995.

BACKGROUND OF THE INVENTION

1. Field of the Invention

The present invention relates to a device for automatically distributing food to fish in an aquarium. More specifically, the invention distributes the food without food loss due to moisture adhesion in the delivery system.

2. Description of the Prior Art

The prior art illustrates an abundance of automatic fish feeding devices for aquariums. Most the known systems have a moisture buildup problem which contaminates the fish food and also clogs the dispensing mechanism. Also, many of the prior art systems do not protect the fish food from environmental effects or pests.

U.S. Pat. No. 5,138,979, issued Aug. 18, 1992 to Baird et al. discloses a solenoid activated plunger for dispensing fish food requiring a manual operation in order to dispense food of various sizes.

U.S. Pat. No. 3,717,125, issued Feb. 20, 1973 to Sanders discloses an automatic fish food dispenser that is positioned outboard of the aquarium requiring special positioning of the aquarium and leveling of the dispenser.

U.S. Pat. No. 5,282,438, issued Feb. 1, 1994 to McLaughlin discloses an aquarium having an elaborate feeding scheme.

U.S. Pat. No. 4,059,072, issued Nov. 22, 1977 to Vassallo et al. discloses an aquarium lighting and feeding device a rotating timer vertically positioned, and a turntable that carries a plurality of food scoops, such that as the timer rotates a horizontally extended rod from the timer engages the turntable moving the one of the feeding scoops over a hole allowing the food to fall into the aquarium. The feeder of Vassallo et al. does not keep the fish food from environmental conditions or pests.

U.S. Pat. No. 5,119,764, issued Jun. 9, 1992 to Tum, discloses a combination fish feeder and water filtration system having a cantilever mechanism for counterbalancing a portion of the filtered water with a food dispensing chute.

None of the above inventions and patents, taken either singly or in combination, is seen to describe the instant invention as claimed.

SUMMARY OF THE INVENTION

Accordingly, it is a principal object of the invention is to provide a device to automatically distribute fish food into an aquarium.

It is another object of the invention is to reduce food loss due to moisture buildup in the food delivery system.

It is a further object of the invention is to provide a universal food type delivery device.

It is yet a further object of the invention is to provide an adjustable universal food type delivery mechanism.

Still another object of the invention is to provide a device that is low cost and low maintenance.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention may be directly installed on an aquarium and is ingeniously designed to aesthetically improve the appearance of the aquarium as a decoration. The electronic fish feeder of the present invention provides a convenient and reliable means for maintaining the lives of the fish on a routine basis, especially, for the busy or forgetful person. More importantly, the fish feeder of the present invention is useful for maintaining the aquarium life while the pet owners are away for any length of time.

Figure 1:
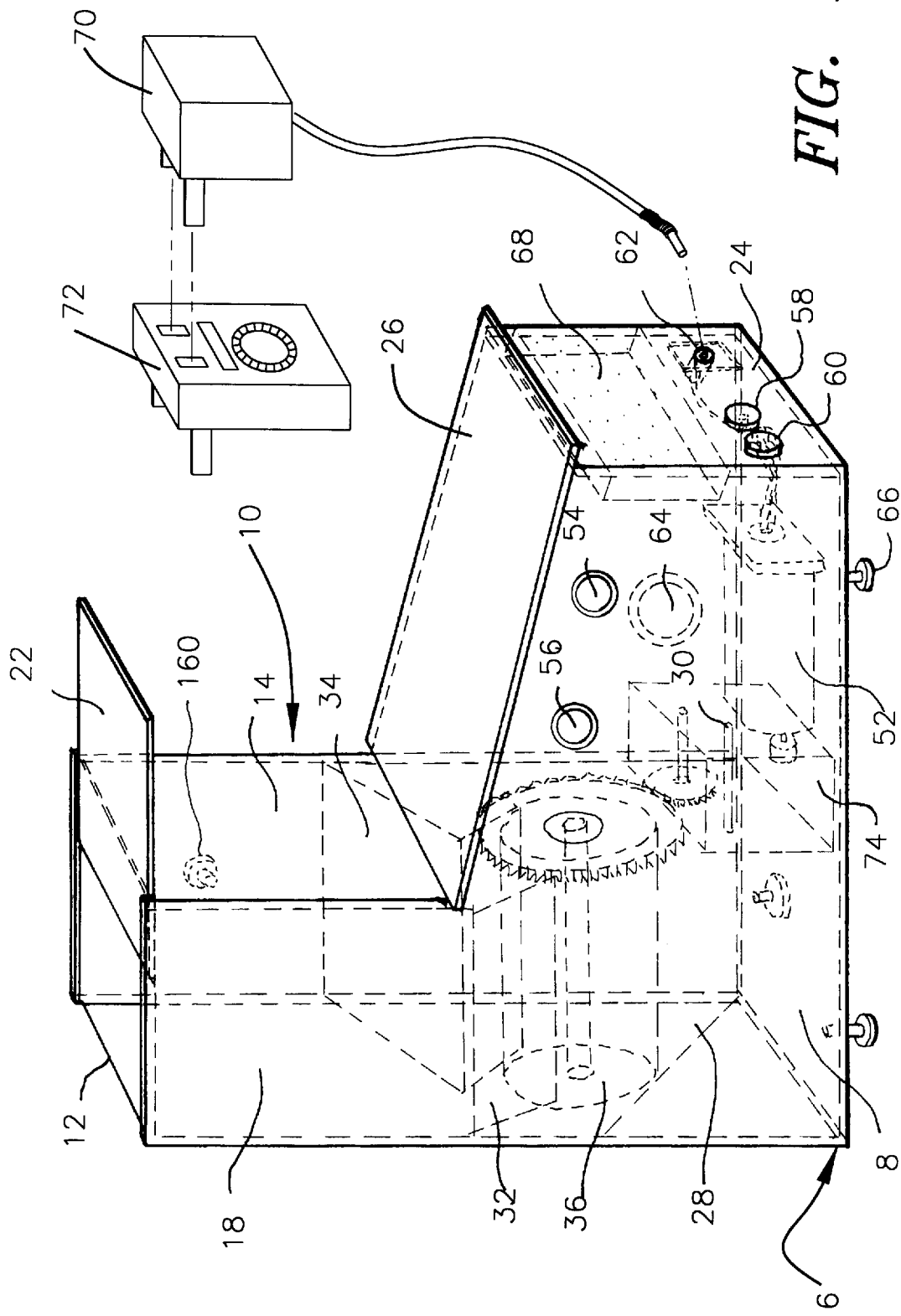
FIG. 1 is a perspective view of the present invention showing the internal components.
Figure 2:
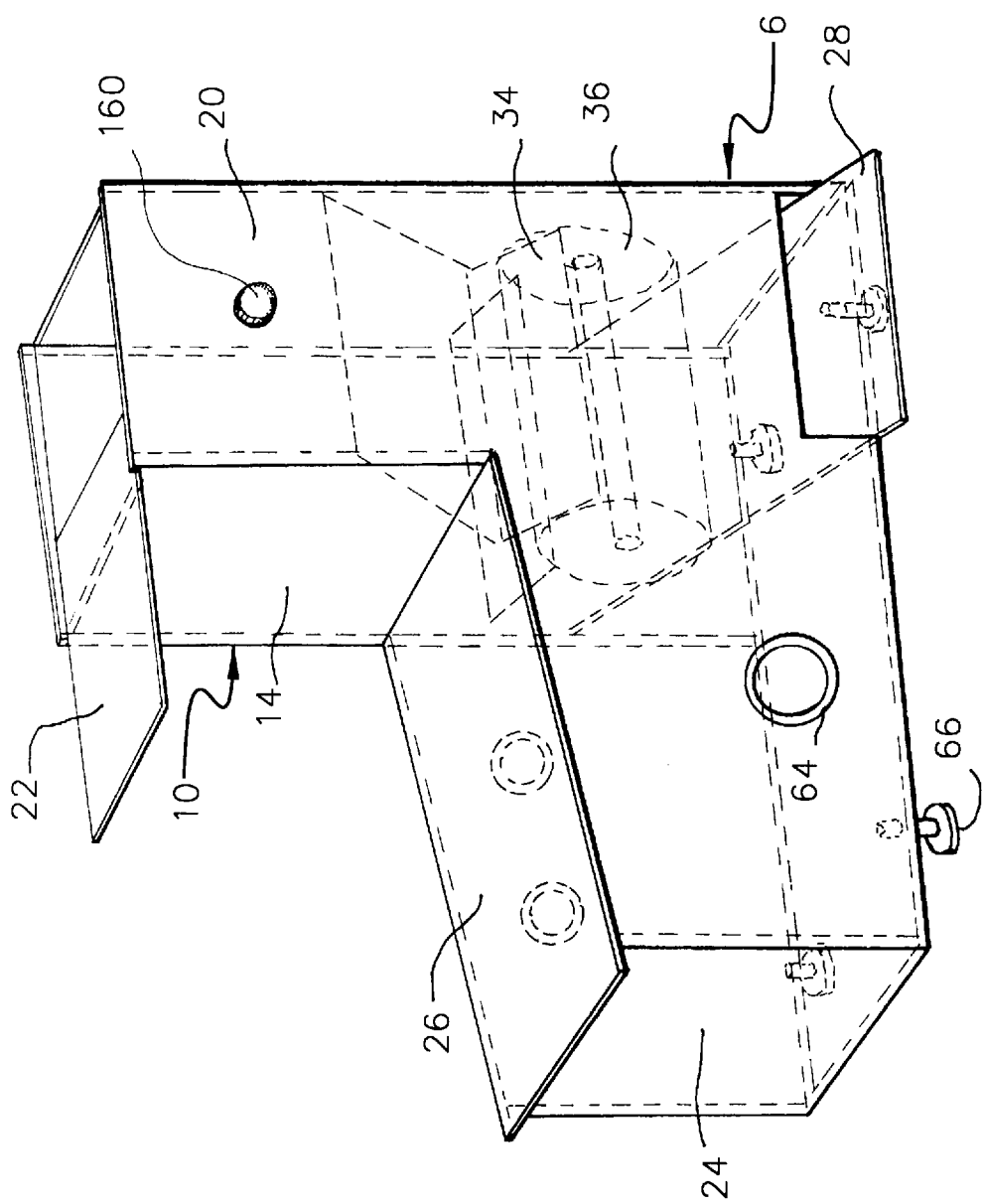
FIG. 2 is a perspective view of the present invention from the rear showing the internal components.
Figure 2A:
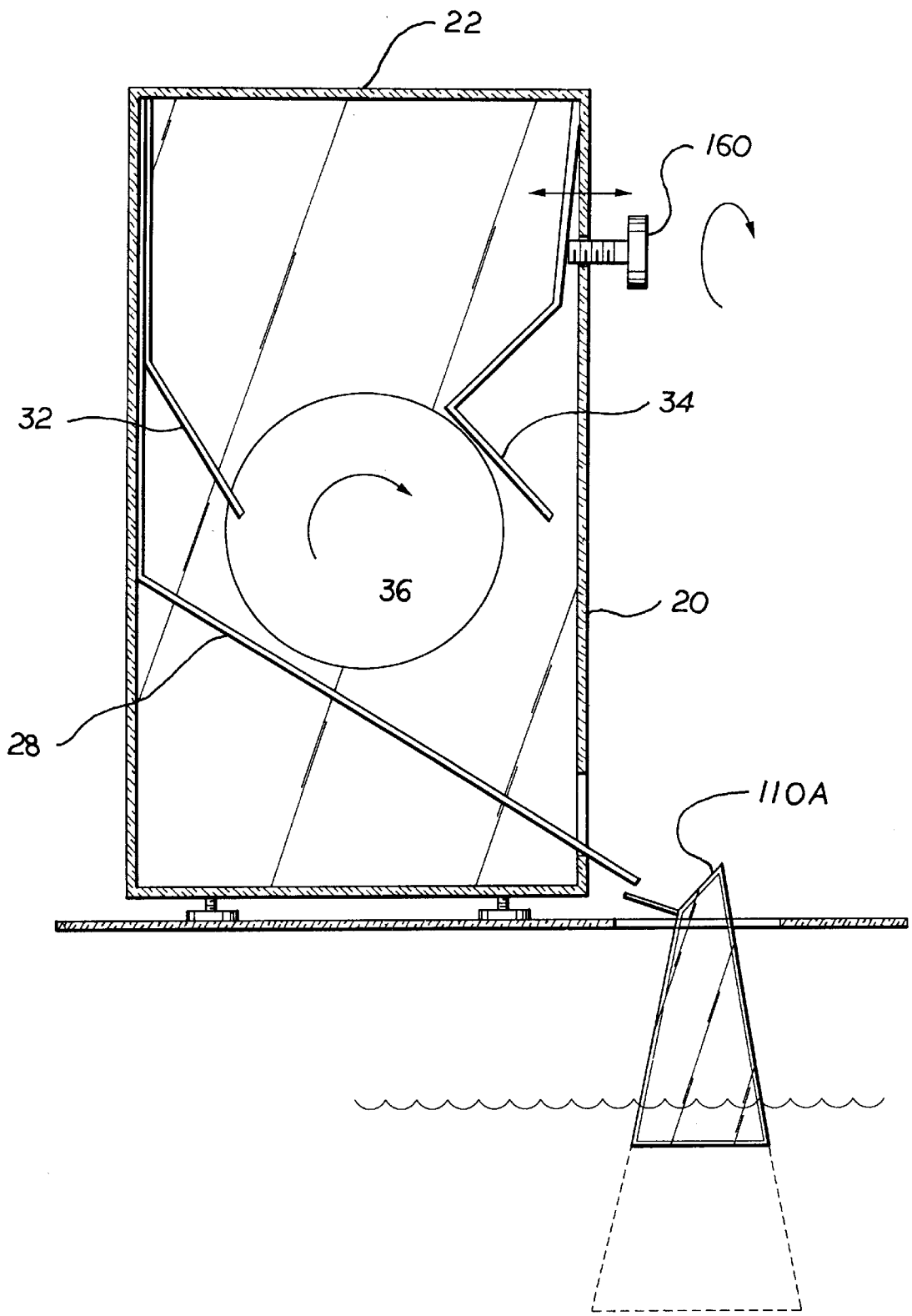
FIG. 2A is a cross sectional view of the hopper showing the baffle adjustment.

Referring now to the drawings, in FIGS. 1, 2, and 2A, the electronic fish feeder is shown. The feeder has a housing 6 that is aesthetically appealing and structurally sound for housing and supporting the electronic and mechanical components. The housing 6 has a base plate 8 within which are four adjustable feet 66 for leveling the housing 6 on the aquarium top. The base plate 8 supports the front main wall 18, the rear main wall 20, the long end wall 12, and the short end wall 24. The housing 6 is generally rectangular in shape, however, the housing 6 may have cylindrical portions. Parallel to and axially displaced above the short end wall 24 is an upper end wall 14. The long end wall 12, the upper end wall 14, and the short end wall 24 are parallel. The front main wall 18 and the rear main wall 20 are parallel. The main walls (18, 20) and the end walls (12, 14, 24) are perpendicular such that the long end wall 12 and upper end wall 14 form with the corresponding portions of the main walls 18, 20 a vertical projection of the housing 6, generally referred to as hopper 10. In the preferred embodiment, hopper 10 has a removable cover 22 for access to the inside of hopper 10 for replenishing the supply of fish food. Cover 22 also serves the function of maintaining the fish food in an uncontaminated state, i.e., it allows the fish food to retain freshness and keeps disease carrying would be pests out. Extending from the bottom of upper end wall 14, along the sloping edges of front and rear main walls 18, 20, to the top edge of short end wall 24, is a roof 26 covering the remaining internal portion of the housing 6. The rear wall 20 of hopper 10 has a single adjustment screw 160 having a knob type head (note FIG. 2A).

The electronic fish feeder receives a DC power supply from a conventionally available AC to DC power adapter 70 which plugs into a standard household outlet and converts the common 110 volts 60 Hertz AC electric power supply to a 9 volt DC power supply. The electrical coupling of this type is standard in the art. Internally of the housing is a number of components for electronically and automatically dispensing fish food. The electronic fish feeder is controlled by a electronic timing circuit (discussed below) on printed circuit board 68. The circuitry on PCE 68 controls the operation of motor 52, and indicators 54, 56. The motor 52 turns a drive gear which cooperates with other gears in a conventional gear box 74 for reducing the number of revolutions at the output of the gear box 74. The output of the gear box drives feed gear which is coupled to feed cylinder 36, located at the bottom of food hopper 10. As the feed cylinder 36 turns, fish food is deposited onto the food distribution slide 28. The feed hopper 10 may optionally have a dividing baffle for separating flake food from pellet food.

In order to retain the food in the hopper 10, a pair of baffles 32, 34 is used. The front food retaining baffle 32 angles in from the front main wall 18 such the food is held above the feed cylinder 36 and directs the food toward the cylinder 36. The front food retaining baffle 32 also serves the purpose of dislodging the fish food from the feed cylinder 36 during rotation. The food distribution baffle 34 is formed so that it flexes when the fish food is forced passed by the rotation of the feed cylinder 36. The flexing action of the food distribution baffle 34 also shakes the food preventing the buildup and/or packing of the fish food between food distribution baffle 34 and the feed cylinder 36. The feed cylinder 36 has a rough or highly frictional surface that allows the feed cylinder 36 when rotating to "grab" the fish food and force the food between the feed cylinder 36 and the food distribution baffle 34. Once the food is passed between the feed cylinder 36 and the food distribution baffle 34, the food falls onto a distribution slide 28 and exits the unit through an aperture (note FIG. 2) in the rear main wall 20.

Also, the rear main wall 20 has an adjustment screw 160 therein. The adjustment screw 160 is used to increase or decrease the pressure of the food distribution baffle 34 upon the feed cylinder 36. The applied pressure is used to control the amount of food allowed to pass between the feed cylinder 36 and the food distribution baffle 34. By turning the adjustment screw 160 in the rear wall 20, the adjustment screw 160 moves the lower portion of the food distribution baffle 34. The top portion of the food distribution baffle 34 is permanently attached or secured to the top of the rear wall 20. The unit includes a vibratory member 30 coupled to the gear box 74 that shakes the fish food down the smooth inclined surface of the distribution slide 28, through the aperture and into a feed funnel (discussed below). The particular function of the vibratory member 30 is to keep the fish food from settling on the food distribution slide 28. It is important note that the vibratory member 30 also reduces the amount of cleaning and maintenance because of the shaking action. That is, the vibratory member 30 helps prevent clogging of the food distribution aperture in the rear main wall 20.

Figure 3:
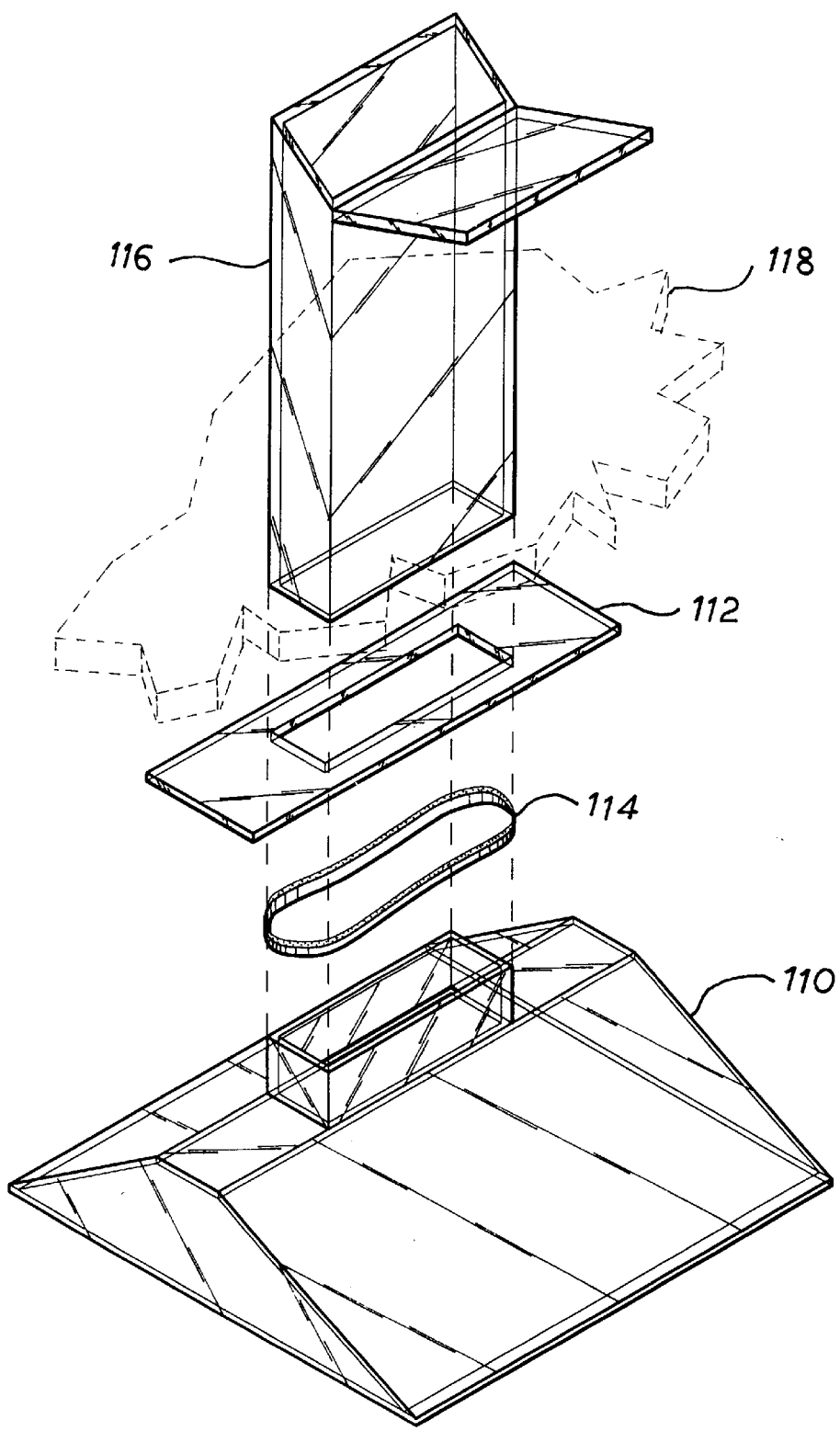
FIG. 3 is an exploded isometric view of the feed funnel of the present invention in use.
Figure 4:
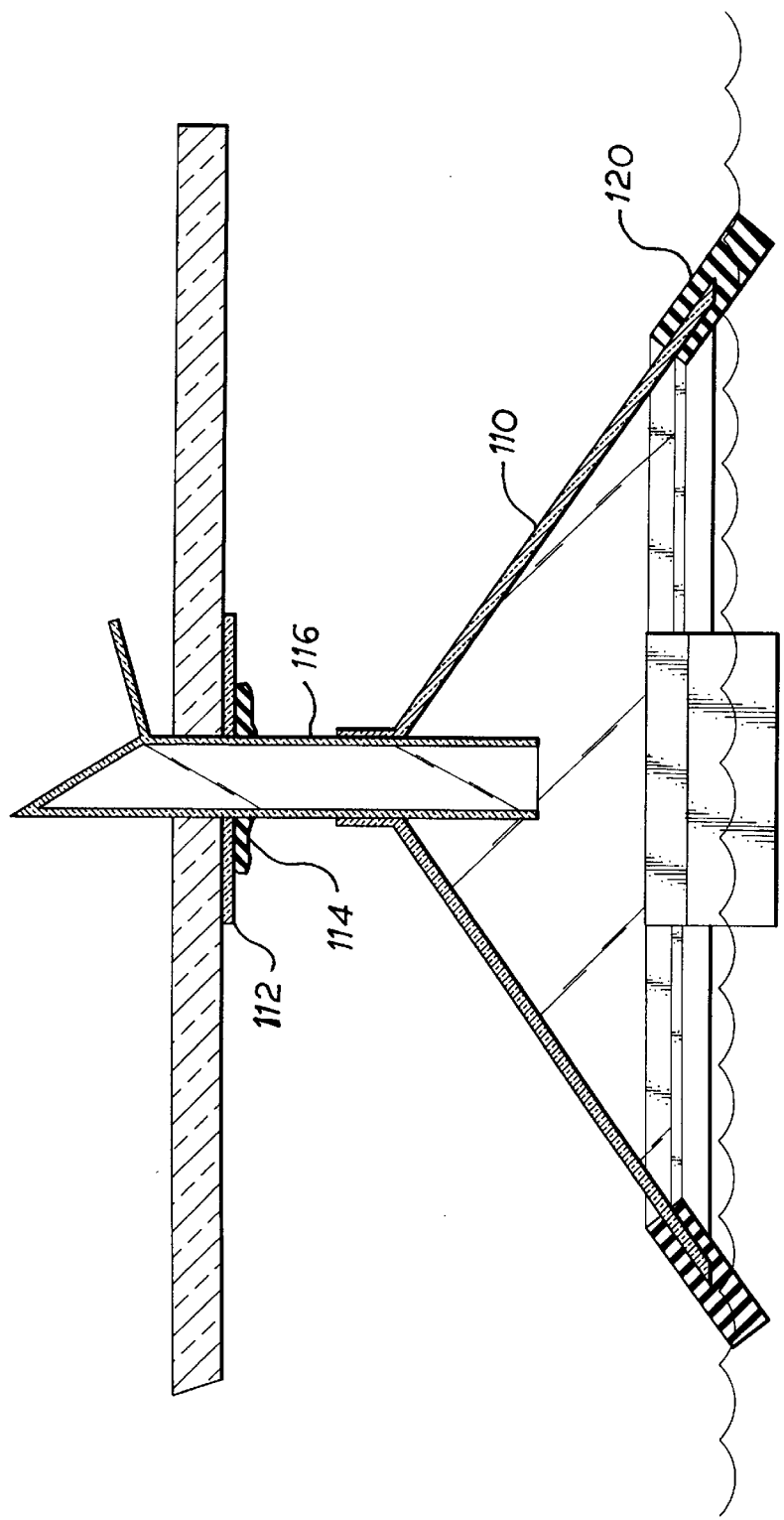
FIG. 4 is an elevational sectional view of the feed funnel in an aquarium.

With respect to FIGS. 3 and 4, feed funnel 110 is formed to match the slope of the food distribution slide and the aperture. Once the fish food exits the unit via the slide 28 and aperture, the feed funnel 110 directs the fish food into the aquarium. The feed funnel 110 also protects the fish food and the unit from moisture deposits and food accumulation. This is accomplished by the preferred embodiment by a rectangular funnel 110 that is inverted and extended below the water level of the aquarium. The neck 116 of the feed funnel extends from the aperture in the rear main wall 20 through the aquarium cover 118. The buoyancy of the feed funnel is offset by a retaining plate 112 below the cover 118 and an elastic retaining plate ring 114 for positioning the retaining plate 112 below the cover 118. The rim of the feed funnel 110 is covered with a foam material 120. The foam material 120 helps to maintain the feed funnel 110 buoyant on the surface of the water, and also the foam helps to reduce the bubbles and waves under the feed funnel 110. This feature reduces the amount of moisture in the feed funnel 110 to a negligible amount, if any. Alternatively, the feed funnel 110 may be removed due to physical constraints in an aquarium. The present invention accomplishes the moisture reduction by extending the neck 116 below the surface of the water. Thus the fish food is distributed into the water of the aquarium where it is consumed by the fish therein.

Figure 4A:
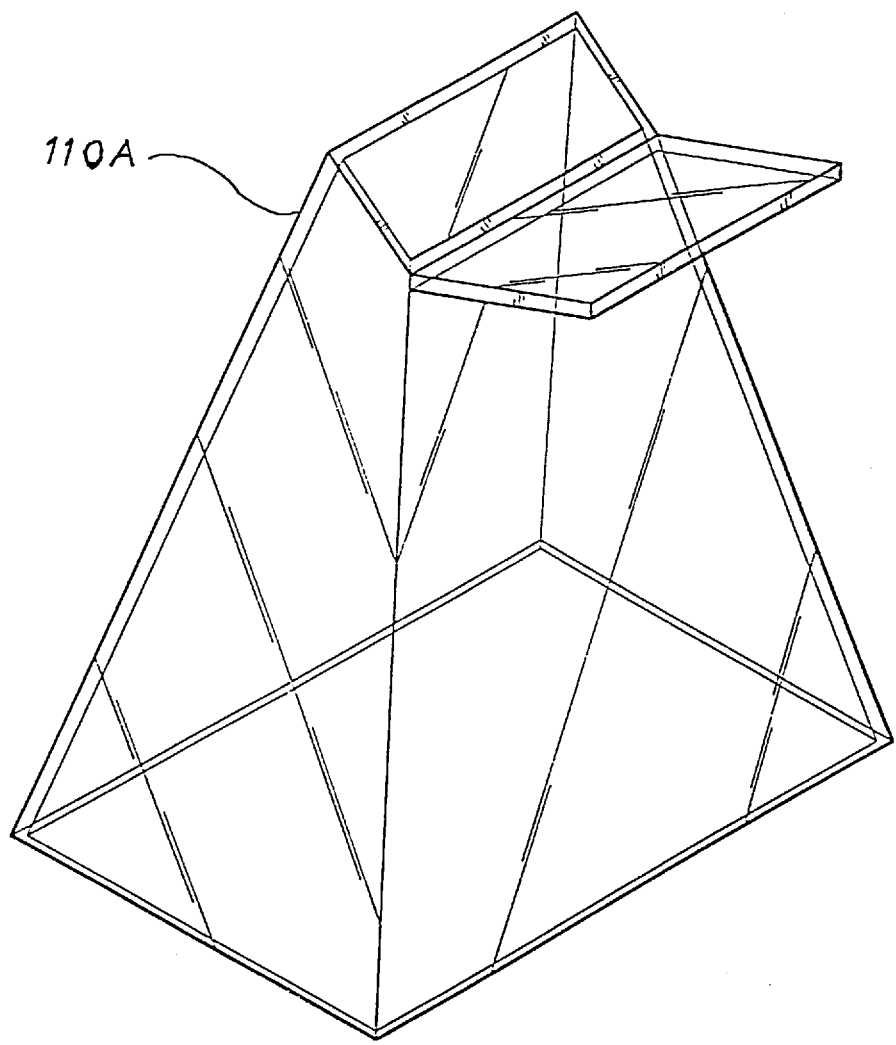
FIG. 4A is an isometric view of an alternative feed funnel of the present invention.
Figure 4B:
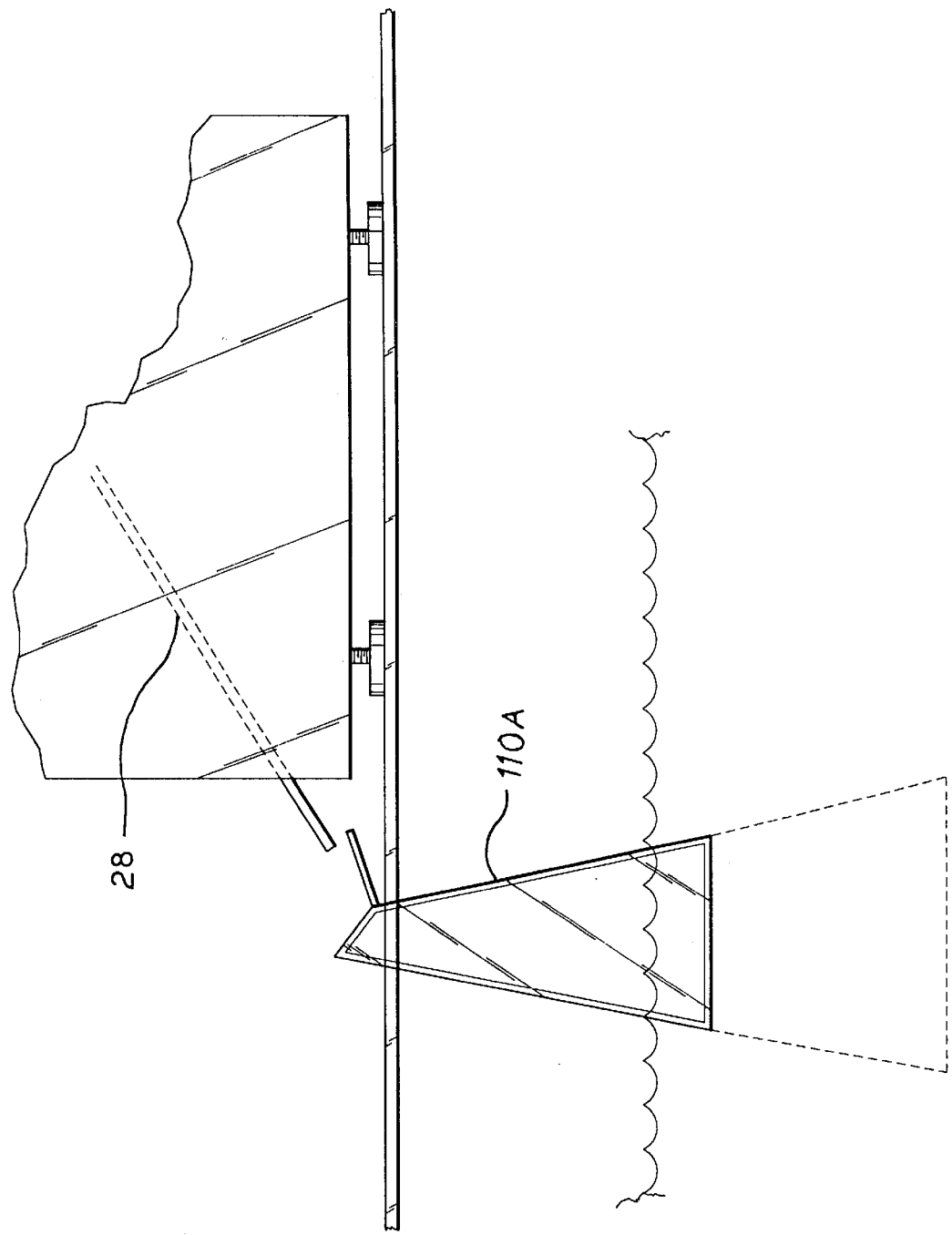
FIG. 4B is an elevational view of the alternative feed funnel in use.

FIGS. 4A and 4B show an alternative feed funnel for use in the present invention, like the feed funnel of FIGS. 3 and 4. Applicant has found that the alternative feed funnel 110A, having the shape of an inverted rectangular cone, provides for an ease of manufacturing and use. The feed funnel 110A cooperates and functions the same as the feed funnel 110 of FIGS. 3 and 4. The advantages of the feed funnel 110A is the singular piece construction. This feature allows the lower end of the feed funnel 110A to be cut to a desired length just below the water line of the aquarium, note the dotted line of FIG. 4B.

Figure 5:
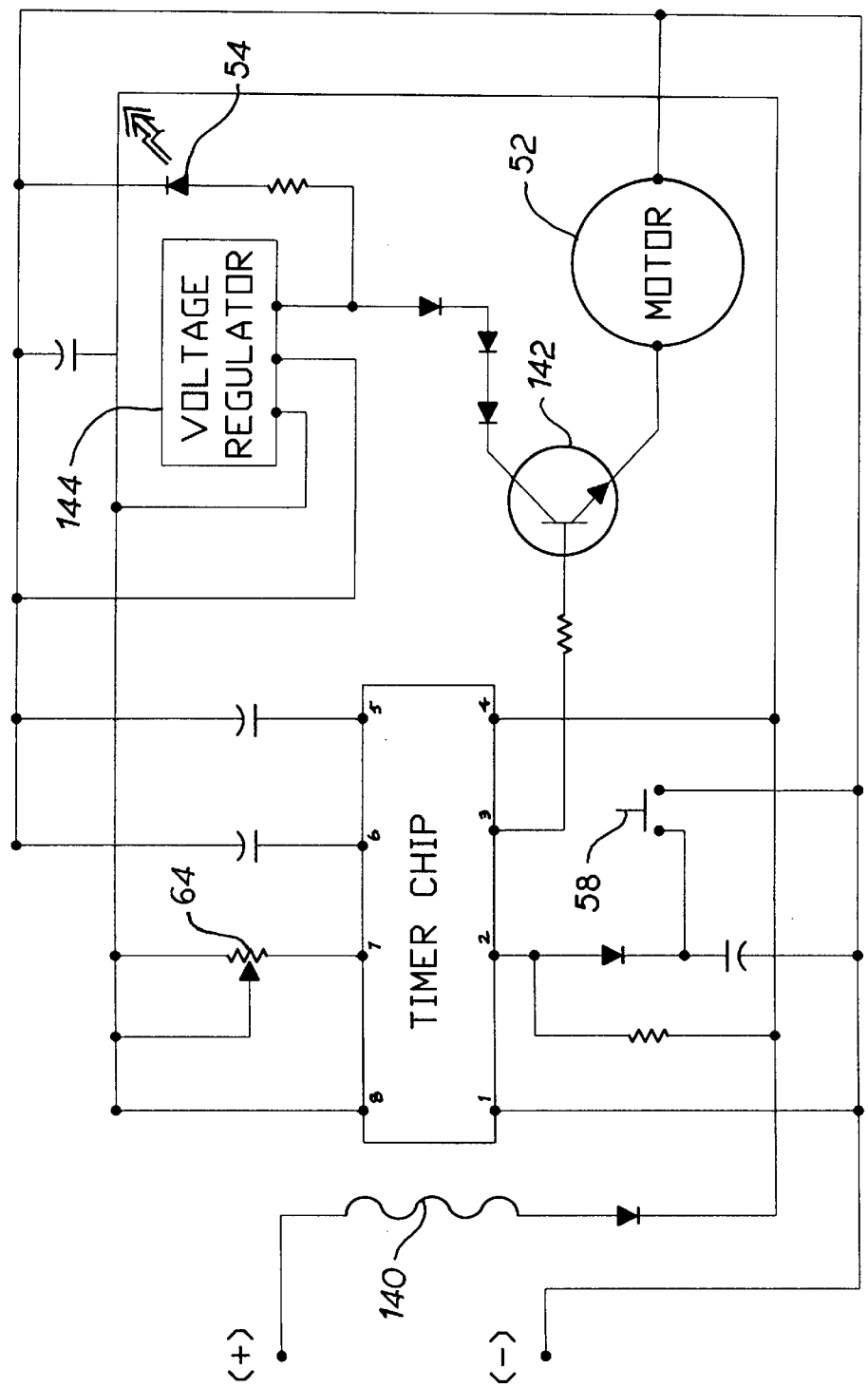
FIGS. 5, 6, and 7 are schematic diagrams of control circuits in the present invention.

Referring to FIG. 5, the basic schematic circuit: for controlling the feeding operation of the unit. The heart of the circuit is a conventional timer chip (generally a standard 555 timer). The circuit receives 9 volt DC from the power adapter at power jack 62, the positive input is coupled across a fuse 140 for protecting the circuit from electrically overloading. Potentiometer 64 and switches 58, 60 are accessible from the outside of the unit (note FIGS. 1 and 2) in a conventionally known manner. The timer circuit, once connected to power, will operate the motor 52 executing the feeding operation for a predetermined period of time. The time period is set by the potentiometer 64. The circuit also includes a voltage regulator 144 that provides the voltage for power indicator 54. The output of voltage regulator also provides the power signal driving motor 52. The power signal is conducted to the motor via an NPN transistor 142 that is biased or turned on by the timer chip and after the predetermined length of time the transistor is turned off by the timer chip.

Figure 6:
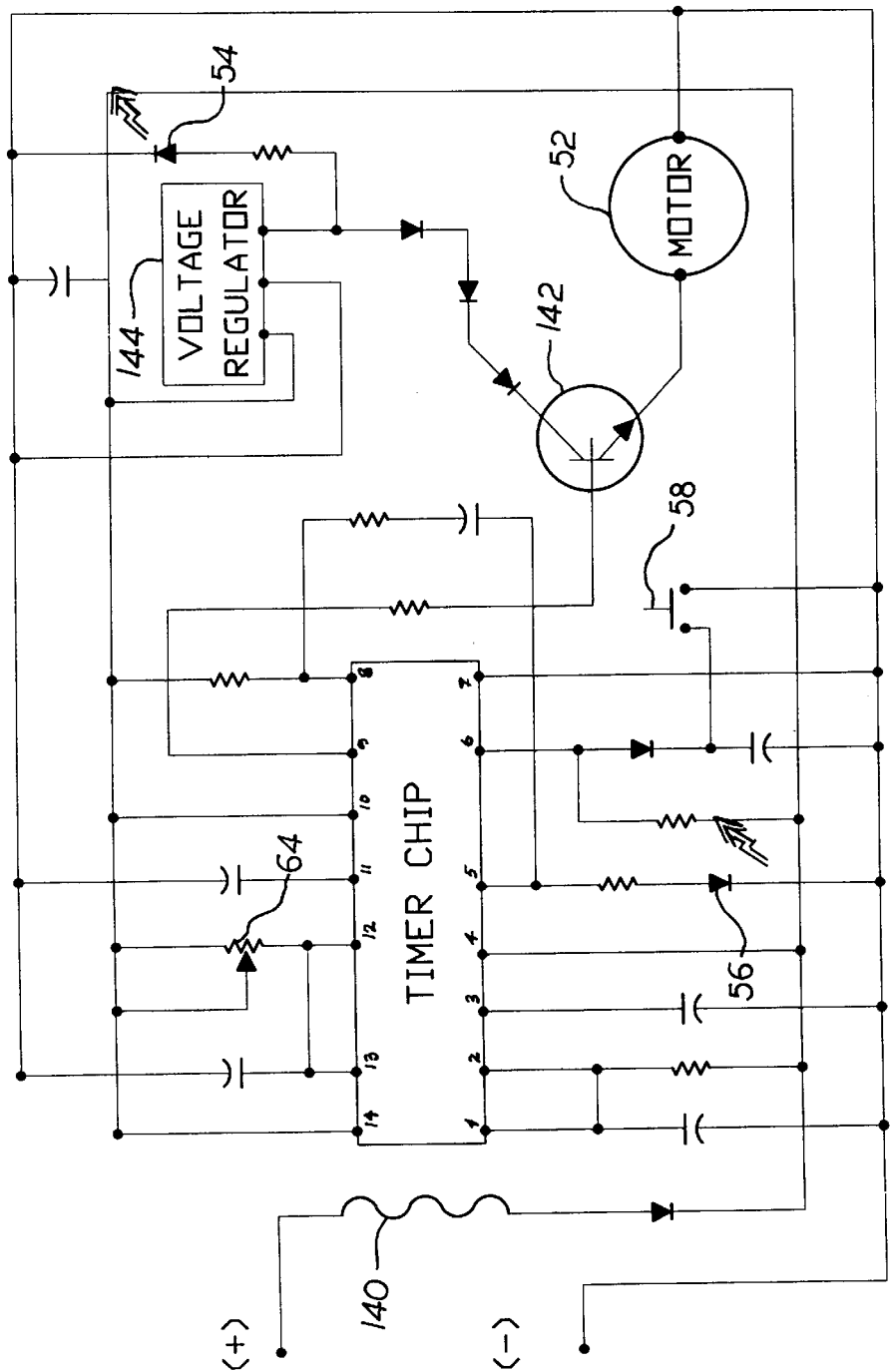
Figure 7:
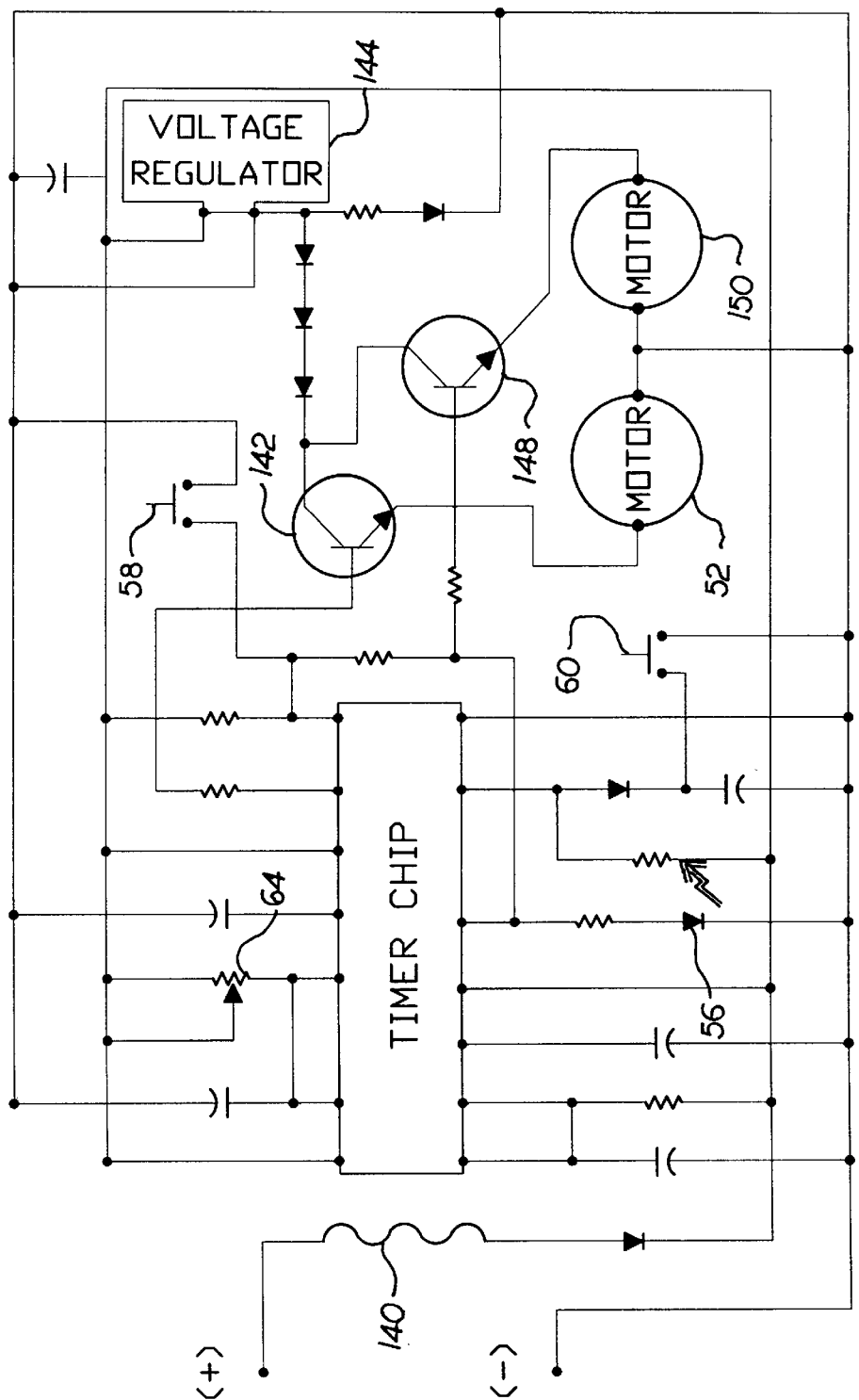

FIGS. 6 and 7 illustrate alternative schematics to FIG. 5 for operating the fish feeder unit. Firstly, the eight pin timer chip is replaced by a more versatile 14 pin timer chip (generally a conventionally known 556 timer circuit chip). In these embodiments the functions and electrical couplings are virtually the same as in FIG. 5, however, these embodiments also allow for a second indicator 56 is be turned on for approximately two (2) minutes before the unit begins feeding fish. This feature allows the aquarium owners to be alerted when the unit is operating so that the feeding may be witnessed. It is also commonly known that in time that the fish will become accustomed to the feeding indication 56 and be ready to receive the food as it is distributed. FIG. 7 further illustrates the control circuit having an additional function of actuating other decorative enhancements for the fish feeder unit, e.g., motor 150 for driving windmill (note FIG. 7) that will turn continuously or just during the feeding operation. An additional NPN transistor 148 is needed to drive the additional motor 150.

Although the connections of the circuit on circuit board are not completely set forth, one having ordinary skill in the art would be able to understand the circuits. Also, the use of alternative circuit configurations are also encompassed by this disclosure, for example, in lieu of the external timer switch 72, a programmable clock for initiating the feeding operations could be incorporated into the circuitry. Further, the circuitry, along with an appropriate gear box 74 reduction ratio may operate the motor 52 and the feed cylinder 36 continuously, as long as power is provided.

Figure 8:
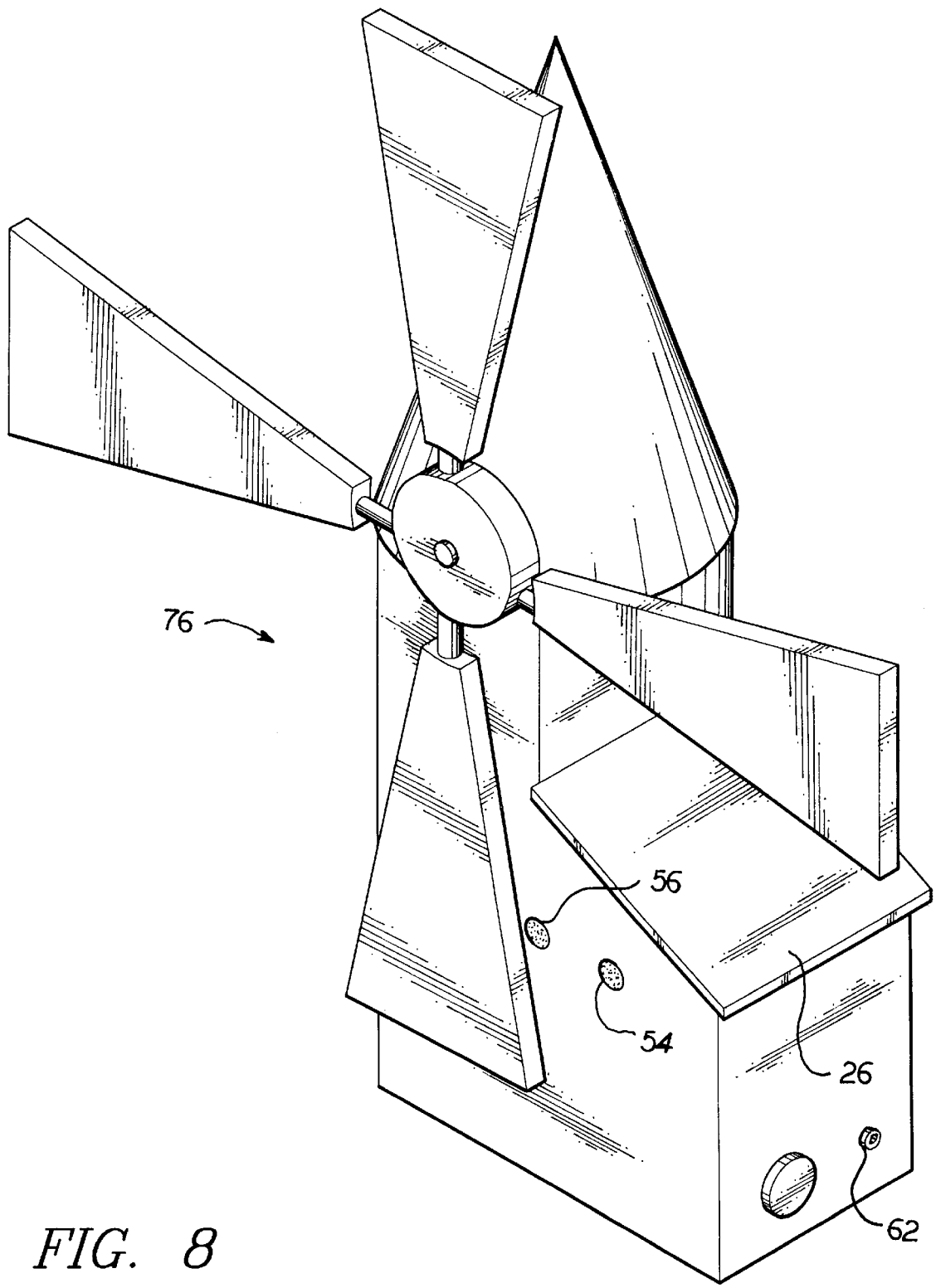
FIG. 8 is a perspective view of an alternative embodiment having a dynamic decorative top.

FIG. 8 is an alternative housing design illustrating a windmill 76. The windmill 76 is run by the motor 150 of FIG. 7. Although the windmill 76 is shown, it is conceivable to use any other type of electricity responsive devices, such as chimes, animated figurines, lights, carrousels, etc. These devices may operate on demand as well as in response to the timing circuitry.

The disclosure has been directed to the specific preferred embodiment, however, numerous other embodiments are also considered within the scope of the claimed invention. For instance, multiple feeders can be triggered at one time from one programmable timer. Further, the feeders may be triggered by a completely separate system, such as a home security system or an aquarium light timer. Various other timer types may be used to trigger the feeders of the present invention. For example, built in digital timers, or detachable remote transmitters. The preferred embodiment utilizes standard AC power converted to DC power via an adapter, however, battery power as a source of electrical power is useable.

It is also in the scope of this claimed invention to accommodate any exterior shape. For instance, the electronic fish feeders of the instant invention may vary in height, or girth for installing in any aquarium environment. For example, an aquarium mounted in-wall will not necessarily require the aesthetic contributions of the invention, rather a shortened hopper that: fits easily in the small space above the aquarium in the wall.

Additionally, the extension of the apparatus to distribute food to other types of small caged pets is also within the scope of this disclosure. For example, the device may be used to feed birds, gerbils, hamsters, turtles, etc.

It is to be understood that the present invention is not limited to the embodiments described above, but encompasses any and all embodiments within the scope of the following claims.

We claim:

1. A feeding device in combination with a cage for delivering foodstuffs to caged pets automatically comprising:

a food hopper having a removable cover, a front wall, a back wall having an exit aperture, a pair of side walls, and an open bottom;

a cylinder rotatably disposed beneath said food hopper at said open bottom, said cylinder having an irregular surface;

a first baffle extending from said front wall toward and radially engaging said irregular surface of said cylinder, said first baffle and said cylinder closing a portion of said open bottom of said hopper;

a second baffle extending from said back wall to a first position above said cylinder, and bending and retreating from said first position toward said back wall, forming a tangent against said cylinder, and said second baffle and said cylinder closing the remaining portion of said open bottom of said hopper;

a slide member having a smooth inclined surface disposed beneath said hopper for directing the foodstuffs from said hopper to the caged pet through said exit aperture;

vibrating means operatively coupled to said slide member for encouraging the foodstuffs to advance down said smooth inclined surface of said slide member;

motor means having a control circuit for systematically operating said motor means, said motor means operatively coupled to said cylinder for rotation thereof, said motor means also operatively coupled to said vibrating means for causing said vibrating means to vibrate; and a distribution chute coupled to said exit aperture for receiving the foodstuffs from said slide member and distributing said foodstuffs to the caged pets, said distribution chute extending from said exit aperture into the cage of the caged pet;

wherein, said motor means rotates said cylinder, said irregular surface of said cylinder pushes the foodstuffs between said second baffle and said cylinder at said tangent, the foodstuffs falling onto said slide member, said vibrating means responsive to said motor means vibrating said slide member causing the foodstuffs to slide through said exit aperture into said distribution chute.

2. The combination according to claim 1, further comprising adjustment means disposed in said back wall for controlling the amount of foodstuffs allowed to pass through said exit aperture.

3. The combination according to claim 1, said distribution chute comprising an inverted rectangular funnel shaped member having a large end and a relatively small end.

4. The combination according to claim 3, wherein said cage is an aquarium having a water surface, and wherein the large end of said rectangular funnel shared member being disposed below the water surface, and the small end of said rectangular funnel shaped member being adjacent said exit aperture, thereby directing the foodstuffs from said exit aperture into the water of the aquarium;

whereby, the distribution chute forms a vapor lock over the area of water under said distribution chute.

5. The combination according to claim 1, further comprising indication means coupled to said control circuit for visually indicating when the feeding operation is actuated.

6. The combination according to claim 1, further including additional motor means coupled to said control circuit and being responsive thereto, for generating a mechanical motion independent of said feeding operation so as to provide a mechanical indication when the feeding operation is actuated.

* * * * *